United States Patent
Sun et al.

(10) Patent No.: US 10,728,788 B2
(45) Date of Patent: Jul. 28, 2020

(54) BEAM INFORMATION ACQUISITION METHOD, BEAM INFORMATION REPORTING METHOD, NETWORK SIDE DEVICE AND TERMINAL

(71) Applicant: VIVO MOBILE COMMUNICATION CO., LTD., Chang'an Dongguan (CN)

(72) Inventors: Xiaodong Sun, Chang'an Dongguan (CN); Yu Ding, Chang'an Dongguan (CN); Yang Song, Chang'an Dongguan (CN)

(73) Assignee: VIVO MOBILE COMMUNICATION CO., LTD., Chang'an Dongguan, Guangdong (CN)

( * ) Notice: Subject to any disclaimer, the term of this patent is extended or adjusted under 35 U.S.C. 154(b) by 0 days.

(21) Appl. No.: 16/494,917

(22) PCT Filed: Feb. 1, 2018

(86) PCT No.: PCT/CN2018/074909
§ 371 (c)(1),
(2) Date: Sep. 17, 2019

(87) PCT Pub. No.: WO2018/166304
PCT Pub. Date: Sep. 20, 2018

(65) Prior Publication Data
US 2020/0100129 A1   Mar. 26, 2020

(30) Foreign Application Priority Data
Mar. 17, 2017  (CN) .......................... 2017 1 0161461

(51) Int. Cl.
*H04W 24/10*  (2009.01)
*H04W 72/04*  (2009.01)

(52) U.S. Cl.
CPC ......... *H04W 24/10* (2013.01); *H04W 72/042* (2013.01); *H04W 72/046* (2013.01)

(58) Field of Classification Search
CPC ..... H04W 24/00; H04W 24/02; H04W 24/04; H04W 24/06; H04W 24/08; H04W 24/10;
(Continued)

(56) References Cited

U.S. PATENT DOCUMENTS

| 2014/0003239 A1 | 1/2014 | Etemad et al. |
| 2015/0124726 A1 | 5/2015 | Ni et al. |

(Continued)

FOREIGN PATENT DOCUMENTS

| CN | 102237957 A | 11/2011 |
| CN | 102263584 A | 11/2011 |

(Continued)

OTHER PUBLICATIONS

Extended European Search Report related to Application No. 18768056.6 dated Jan. 24, 2020.
(Continued)

*Primary Examiner* — Siu M Lee
(74) *Attorney, Agent, or Firm* — Miller, Matthias & Hull LLP

(57) ABSTRACT

Disclosed in the embodiments of the present disclosure are a beam information acquisition method, a beam information reporting method, a terminal, and a network side device. The beam information acquisition method includes: transmitting configuration information to a terminal, and receiving beam information reported by the terminal based on the configuration information. The configuration information comprises at least one of a report type identifier, a report offset, an information report identifier, and a beam-quality-report-switching identifier.

20 Claims, 7 Drawing Sheets

(58) Field of Classification Search
CPC . H04W 72/04; H04W 72/042; H04W 72/044; H04W 72/046; H04W 72/08; H04W 72/085
See application file for complete search history.

(56) References Cited

U.S. PATENT DOCUMENTS

| | | | |
|---|---|---|---|
| 2016/0309376 A1 | 10/2016 | Liu et al. | |
| 2016/0338033 A1 | 11/2016 | Xiao et al. | |
| 2018/0006697 A1 | 1/2018 | Song et al. | |
| 2018/0109307 A1* | 4/2018 | Huang | H04W 56/001 |
| 2018/0115357 A1 | 4/2018 | Park et al. | |
| 2020/0014474 A1* | 1/2020 | Khirallah | H04B 17/309 |
| 2020/0045684 A1* | 2/2020 | Futaki | H04W 72/085 |

FOREIGN PATENT DOCUMENTS

| | | |
|---|---|---|
| CN | 102684835 A | 9/2012 |
| CN | 103535065 A | 1/2014 |
| CN | 104350689 A | 2/2015 |
| CN | 104796185 A | 7/2015 |
| CN | 106375044 A | 2/2017 |
| CN | 107409318 A | 11/2017 |
| CN | 105009640 A | 10/2018 |
| WO | WO 2016/072052 A1 | 5/2016 |
| WO | WO 20161085266 A1 | 6/2016 |
| WO | WO 2017/014572 A1 | 10/2016 |
| WO | WO 2016163842 A1 | 10/2016 |
| WO | WO 2017/028007 A1 | 2/2017 |

OTHER PUBLICATIONS

Huawei et al. "CSI-RS design for beam management", 3GPP Draft; R1-1701694, 3$^{rd}$ Generation Partnership Project (3GPP), Mobile Competence Centre; 350 Route Des Lucioles; F-06921 Sophia-Antipolis Cedex; France, vol. Ran WG1, No. Athens, Greece; Feb. 13, 2017-Feb. 17, 2017 Feb. 12, 2017.
International Search Report related to Application No. PCT/CN2018/074909 dated Apr. 23, 2018.
Firsct CN Office Action related to Application No. 201710161461.0 dated Jun. 3, 2019.
Second CN Office Action related to Application No. 201710161461.0 dated Aug. 8, 2019.

* cited by examiner

US 10,728,788 B2

BEAM INFORMATION ACQUISITION METHOD, BEAM INFORMATION REPORTING METHOD, NETWORK SIDE DEVICE AND TERMINAL

CROSS-REFERENCE TO RELATED APPLICATIONS

This patent application is a 35 USC § 371 U.S. national stage of International Application No. PCT/CN2018/074909 filed on Feb. 1, 2018, which claims a priority of the Chinese Patent Application No. 201710161461.0 filed in China on Mar. 17, 2017, the disclosures of which are incorporated herein by reference in their entirety.

TECHNICAL FIELD

The present disclosure relates to the field of wireless communications, and in particular to a beam information acquisition method, a beam information reporting method, a network side device and a terminal.

BACKGROUND

With the development of communication technologies, nodes at both communication parties each are communicated in a manner of beamforming. Before communications, the both communication parties need to determine which beam to be used in the subsequent communications. To solve this problem, A User Equipment (UE) of the communication parties, which is also called a terminal, would perform measurement on transmission beams of a base station, and then determine which beam to be used in subsequent communications via management on the beams between the terminal and the base station. However, in the related art, on the one hand, there is no unified reporting scheme for the beam information, and on the other hand, there is a problem that a reporting signaling overhead is large due to reports in an arbitrary way, or the report of the beam information cannot be adapted to the current channel condition.

SUMMARY

Embodiments of the present disclosure provide a beam information acquisition method, a beam information reporting method, a network side device and a terminal, so as to solve the problem that a reporting signaling overhead is large or the reports of the beam information cannot be adapted to the current channel condition.

In a first aspect, an embodiment of the present disclosure provides a beam information acquisition method applied to a network side device. The beam information acquisition method includes: transmitting configuration information to a terminal, wherein the configuration information includes at least one of: (i) a report type identifier, (ii) a report offset, and (iii) an information reporting identifier; and receiving beam information reported by the terminal based on the configuration information. The report type identifier is configured to indicate whether at least two types of beam information are reported together. The at least two types of the beam information include: a resource identifier of a beam and beam quality information. The resource identifier includes a transmission resource identifier. The transmission resource identifier is configured to be used by the terminal to distinguish a transmission beam at a network side. The beam quality information is formed by the terminal through measuring the transmission beam and configured to indicate beam quality of the transmission beam. The report offset is configured to indicate, when the at least two types of the beam information are reported together, an offset on a reported resource. The information reporting identifier is configured to indicate to, when the resource identifier and the beam quality information are reported separately, report the resource identifier and/or the beam quality information.

In a second aspect, an embodiment of the present disclosure provides a beam information reporting method applied to a terminal. The beam information reporting method includes: receiving configuration information transmitted by a network side device, wherein the configuration information includes at least one of: (i) a report type identifier, (ii) a report offset, and (iii) an information reporting identifier; and transmitting beam information to the network side device according to the configuration information. The report type identifier is configured to indicate whether at least two types of beam information are reported together. The at least two types of the beam information include: a resource identifier of a beam and beam quality information. The resource identifier includes a transmission resource identifier. The transmission resource identifier is configured to be used by the terminal to distinguish a transmission beam at a network side. The beam quality information is formed by the terminal through measuring the transmission beam and configured to indicate beam quality of the transmission beam. The report offset is configured to indicate, when the at least two types of the beam information are reported together, an offset on a reported resource. The information reporting identifier is configured to indicate to, when the resource identifier and the beam quality information are reported separately, report the resource identifier and/or the beam quality information.

In a third aspect, an embodiment of the present disclosure provides a network side device. The network side device includes: a first transmitting unit, configured to transmit configuration information to a terminal, wherein the configuration information includes at least one of: (i) a report type identifier, (ii) a report offset, and (iii) an information reporting identifier; and a first receiving unit, configured to receive beam information reported by the terminal based on the configuration information. The report type identifier is configured to indicate whether at least two types of beam information are reported together, wherein the at least two types of the beam information include: a resource identifier of a beam and beam quality information. The resource identifier includes a transmission resource identifier. The transmission resource identifier is configured to be used by the terminal to distinguish a transmission beam at a network side. The beam quality information is formed by the terminal through measuring the transmission beam and configured to indicate beam quality of the transmission beam. The report offset is configured to indicate, when the at least two types of the beam information are reported together, an offset on a reported resource. The information reporting identifier is configured to indicate to, when the resource identifier and the beam quality information are reported separately, report the resource identifier and/or the beam quality information.

In a fourth aspect, an embodiment of the present disclosure provides a terminal. The terminal includes: a second receiving unit, configured to receive configuration information transmitted by a network side device, wherein the configuration information includes at least one of: (i) a report type identifier, (ii) a report offset, and (iii) an information reporting identifier; and a second transmitting unit, configured to transmit beam information to the network side device according to the configuration information. The report type identifier is configured to indicate whether at least two types of beam information are reported together. The at least two types of the beam information include: a resource identifier of a beam and beam quality information. The resource identifier includes a transmission resource identifier. The transmission resource identifier is configured to be used by the terminal to distinguish a transmission beam at a network side. The beam quality information is formed by the terminal through measuring the transmission beam and configured to indicate beam quality of the transmission beam. The report offset is configured to indicate, when the at least two types of the beam information are reported together, an offset on a reported resource. The information reporting identifier is configured to indicate to, when the resource identifier and the beam quality information are reported separately, report the resource identifier and/or the beam quality information.

In a fifth aspect, an embodiment of the present disclosure provides a network side device. The network side device includes: a memory, a processor, and a computer program stored in the memory and configured to be executed by the processor. The processor is configured to execute the computer program, to implement steps of the beam information acquisition method according to the above beam information acquisition method.

In a sixth aspect, an embodiment of the present disclosure provides a terminal. The terminal includes a memory, a processor, and a computer program stored in the memory and configured to be executed by the processor. The processor is configured to execute the computer program, to implement steps of the above beam information reporting method.

In a seventh aspect, an embodiment of the present disclosure provides a computer-readable storage medium storing therein a computer program, wherein the computer program is configured to be executed by a processor, to implement steps of the above beam information acquisition method.

In an eighth aspect, an embodiment of the present disclosure provides a computer-readable storage medium storing therein a computer program, wherein the computer program is configured to be executed by a processor, to implement steps of the above beam information reporting method.

With the beam information acquisition method, the beam information reporting method, the network side device and the terminal according to embodiments of the present disclosure, the configuration information is transmitted to the terminal before the terminal reports the beam information. The report type identifier in the configuration information indicates whether the resource identifier and the beam quality information are reported together, and the information reporting identifier in the configuration information indicates whether the resource identifier and the beam quality information are to be reported. In this way, the terminal may report the information required by the base station in a targeted manner according to the configuration information, rather than reporting all the beam information obtained by the beam discovery and/or measurement, so as to reduce the amount of the reports of unnecessary information, thereby saving the channel overhead. According to embodiments, the configuration information contains information such as the report type identifier and the information reporting identifier, so that the base station is easily to flexibly indicate which pieces of beam information are to be reported by the terminal, according to the current channel conditions, thereby enabling the network side to obtain the result of the terminal with respect to the discovery and/or measurement of the transmission beam which is transmitted by the network side, and also reducing the further degradation of the channel conditions caused by the beam information or the further increased loads on the network side device.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

Schemes of the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
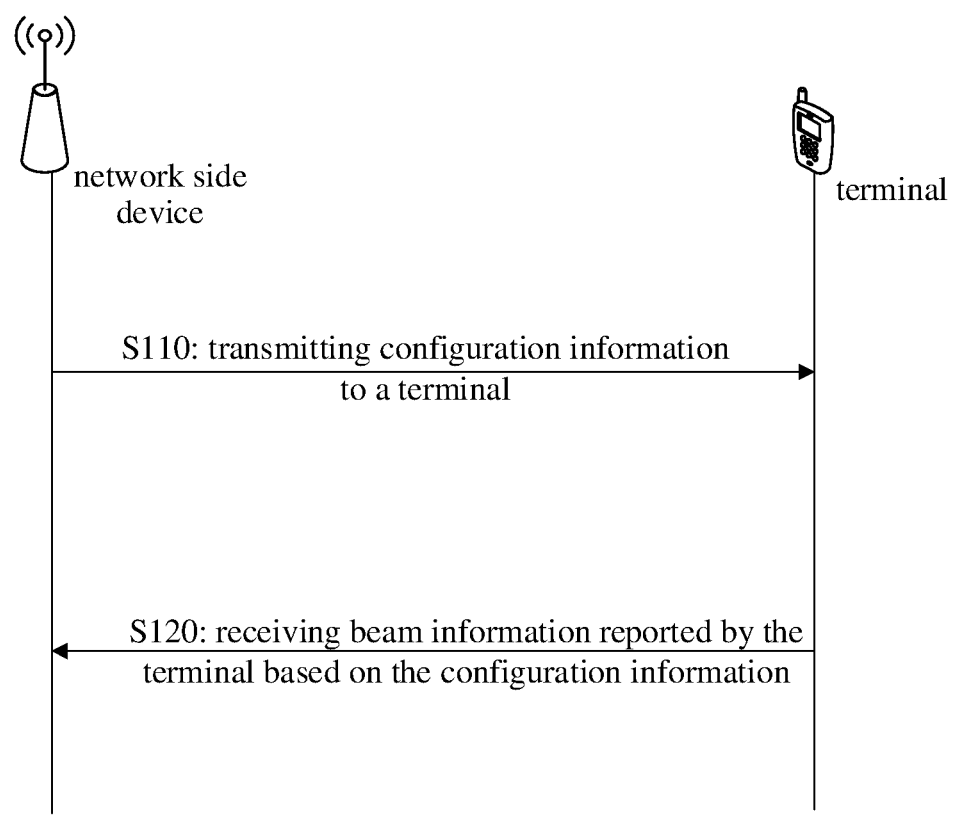
FIG. 1 is a schematic flowchart of a beam information acquisition method according to an embodiment of the present disclosure.

An embodiment of the present disclosure provides a beam information acquisition method, which is applied to a network side device. The network side device may be a network side device of an access network such as a base station. The base station may specifically be a 5G base station (gNB). As shown in FIG. 1, the beam information acquisition method includes steps S110 to S120.

Step S110: transmitting configuration information to a terminal, wherein the configuration information includes at least one of: (i) a report type identifier, (ii) a report offset, (iii) an information reporting identifier, and (iv) a beam-quality-report-switching identifier; and Step S120: receiving beam information reported by the terminal based on the configuration information.

The report type identifier is configured to indicate whether at least two types of beam information are reported together. The at least two types of the beam information include: a resource identifier of a beam and beam quality information. The resource identifier includes a transmission resource identifier and/or a reception resource identifier. The transmission resource identifier is configured to be used by the terminal to distinguish a transmission beam transmitted by a network side. The reception resource identifier is configured to be used by the network side device to distinguish a reception beam of the transmission beam detected by the terminal. The beam quality information is formed by the terminal through measuring the transmission beam and configured to indicate beam quality of the transmission beam. The report offset is configured to indicate, when the at least two types of the beam information are reported together, an offset on a reported resource. The information reporting identifier is configured to indicate to, when the resource identifier and the beam quality information are reported separately, report the resource identifier or the beam quality information. The beam-quality-report-switching identifier is configured to indicate, when the resource identifier and the beam quality information are reported together, the terminal to start or stop reporting the beam quality information.

In this embodiment, the network side device may automatically form the configuration information or receive the configuration information from another device before receiving the beam information from the terminal, and transmits the configuration information to the terminal.

In this embodiment, the configuration information, which is configured by the base station itself or by a network side device of a core network, is used to control related information of the beam information to be reported by the terminal. The network side device of the core network herein may include a network side device such as a Mobility Management Entity (MME). When the configuration information is not configured by the base station itself, it may be received by the base station from another network side device. The configuration information may also be received by the base station from a human-computer interaction interface.

The network side device transmits the configuration information to the terminal in Step S110. In this embodiment, the configuration information may be transmitted from the network side device to the terminal by using various transmission modes. In this embodiment, the network side device may transmit the configuration information to the terminal by using a unicast signaling. For example, the base station transmits the configuration information through at least one of: (i) a Radio Resource Control (RRC) signaling, (ii) a Media Access Control (MAC) layer Control Element (CE), and (iii) a physical layer Downlink Control Indicator (DCI). In this way, the configuration information would be received by the terminal that is required to perform the discovery and/or measurement on the transmission beam of the base station.

In some embodiments, for example, the base station may use the MAC layer CE and the RRC signaling to carry and transmit parts of the configuration information, separately, to the terminal.

In some embodiments, the RRC signaling, the MAC layer CE, and the physical layer DCI may be a New Radio (NR) RRC signaling, a NR MAC layer CE, and a NR physical layer DCI specified in the 5G specification. The RRC signaling, the MAC layer CE, and the physical layer DCI are not limited to the more interfaces in the 5G than the 4G and 4G-preceding mobile communications, but may also be the RRC signaling, the MAC layer CE and physical layer DCI, and the like of the 4G, 3G and even new generation interfaces.

In this embodiment, the configuration information carried by the MAC layer CE, the RRC signaling, or the DCI is transmitted to the terminal through reusing of the signaling in the related art, so that there is no need to additionally design a dedicated signaling for transmitting the configuration information, thereby providing a strong compatibility with existing communication technologies.

After receiving the configuration information, the terminal reports the beam information according to the configuration information. Therefore, in Step S120 of this embodiment, the network side device receives the beam information reported by the terminal. The beam information reported by the terminal here may include at least one of: a resource identifier of a beam and a beam quality information detected by the terminal. The resource identifier here may be a transmission resource identifier or a reception resource identifier. The transmission resource identifier is an identifier indicating a beam transmitted by the base station itself. The reception resource identifier is a resource identifier indicating that which beam is used by the terminal itself to detect the beam transmitted by the base station. Generally, the transmission beam and the reception beam have a corresponding relationship, which is known to both the base station and the terminal communicating with each other. Therefore, in some embodiments, when the reception resource identifier of the reception beam which is used by the terminal to detect the beam transmitted by the base station is reported by the terminal, the base station may determine, according to the reception resource identifier, that which one of the transmission beams transmitted by the base station is detected by the terminal. The beam information reported by the terminal in this embodiment may include the resource identifier and/or beam quality information of the transmission beam of the base station.

In some embodiments, before transmitting the beam to the terminal, the base station may inform the terminal of the transmission resource identifier of the transmission beam transmitted by the base station. In this case, when the terminal receives the transmission beam of the base station, the transmission resource identifier of the transmission beam can be known.

In other embodiments, when a beam is transmitted by the base station, the beam may carry a transmission resource identifier of the beam, which is used for distinguishing the beam from other beams of the base station. When the beam is detected by the terminal, the transmission resource identifier thereof may be extracted from the beam. When the beam information reported by the terminal to the network side device includes one or more transmission resource identifiers, then the beams corresponding to one or more transmission resource identifiers reported by the terminal may be considered to be detected by the terminal at the current location, and therefore the beams may be used by the network side device to transmit information to the terminal.

In some embodiments, when detecting the beam transmitted by the base station, the terminal may perform blind detection by using the reception beam of the terminal itself, and the terminal may determine, according to the correspondence between the transmission beam of the base station and the reception beam of the terminal itself, that which one of the transmission beams is currently detected, thereby obtaining the transmission resource identifier of said transmission beam.

After the terminal determines the detected transmission beam by itself or the reception beam used for detection, the terminal may report the transmission resource identifier of the transmission beam and/or the reception resource identifier of the reception beam as a resource identifier of the beam, to the network side device such as the base station.

In this embodiment, the transmission resource identifier may be: a Channel State Information Reference Signal Resource Indicator (CRI), or a base station antenna port identifier. In some embodiments, the transmission resource identifier may also be a combination of multiple pieces of identification information. For example, the transmission resource identifier may be a combination of a base station antenna port identifier and a transmission time slot identifier of the beam. In some embodiments, the transmission resource identifier may also be one identified by other information having a unique correspondence thereto, for example, may be a sequence identifier of a reference signal corresponding to the beam.

In this embodiment, the reception resource identifier may be: a CRI, a terminal antenna port identifier. In some embodiments, the reception resource identifier may also be a combination of multiple pieces of identification information. For example, the receiving resource identifier may be a combination of a terminal antenna port identifier and a reception time slot identifier or a reception symbol identifier of the beam.

In some embodiments, the beam information may further include beam quality information. In this embodiment, the terminal may not only detect or discover the transmission beam of the base station, but also monitor the beam quality information of the beam detected by the terminal. In this embodiment, the beam quality information may be information indicating a reception strength or a reception quality of the corresponding beam detected by the terminal, such as quality parameters such as a reception power or a signal-to-noise ratio of the beam, and may be for example a Reference Signal Receiving Power (RSRP), Channel State Information (CSI).

In this embodiment, the configuration information includes a report type identifier. The report type identifier here is used to indicate whether at least two types of beam information are reported together. The so called "report together" in this embodiment is to indicate that the two types of beam information are reported by the terminal at one time, rather than reporting in two or more times.

In this embodiment, the report type identifier may be used to at least indicate whether the resource identifier and the beam quality information are reported together, or the resource identifier and the beam quality information are reported separately.

In this embodiment, the configuration information may also include a report offset. In the embodiment, the report offset may be: a time-domain resource offset and/or a frequency-domain resource offset. In this embodiment, the reported resource is a time-frequency resource to be used by the terminal to report beam information.

In the embodiment, the report offset may be used to indicate the offset amount of the reported resources of the two types of beam information when at least two types of beam information are reported together, i.e., when the at least two types of beam information are reported at one time. Specifically, the report offset may be used to indicate the number of offset symbols, the number of offset time slots, and/or the number of offset subframes, of the resource identifier and the beam quality information. The number of offset symbols here is the number of transmission symbols in the difference between the resource carrying the resource identifier and the resource carrying the beam quality information. The number of offset time slots is the number of time slots in the difference between the resource carrying the resource identifier and the resource carrying the beam quality information. The number of offset subframes is the number of subframes in the difference between the resource carrying the resource identifier and the resource carrying the beam quality information. The transmission symbol here may include: an Orthogonal Frequency Division Multiplexing (OFDM) symbol and the like.

The report offset may also be an offset of a frequency-domain resource, such as an offset carrier number. For example, the resource identifier and the beam quality information are carried on different carriers and transmitted to the base station. However, these two carriers may be simultaneously transmitted by the terminal.

In this embodiment, the information reporting identifier is used to indicate to, when the resource identifier and the beam quality information are reported separately, report the resource identifier and/or the beam quality information.

For example, in some scenarios, the network side device such as the base station, knows the resource identifier of the transmission beam currently transmitted by itself, so that there is only a need for the terminal to report the beam quality information of the transmission beam detected by the terminal. In some scenarios, the base station may transmit multiple transmission beams at the same time, and in this case, the terminal only needs to report the resource identifier, depending on which ones of the transmission beams the terminal detects. Therefore, in this embodiment, the base station may indicate the terminal to report the resource identifier or the beam quality information according to the current requirements.

In other scenarios, the network side device may require the terminal to report both, but in a separate manner, the resource identifier and the beam quality information, which may also be indicated by the information reporting identifier. For example, the information reporting identifier may include two bits, which may include four states of "00", "01", "10", and "11". Three of the four states are used to indicate, respectively, that only the resource identifier is to be reported, only the beam quality information is to be reported, and the resource identifier and beam quality information are to be reported separately. Also, when the reporting type identifier indicates that the resource identifier and the beam quality information are reported at one time, the two bits may be reused to be the beam-indication-report-switching identifier, so as to save the signaling overhead of the configuration information.

For example, in some scenarios, the terminal may detect multiple transmission beams transmitted by the base station, all of which may be used by the base station to transmit information to the terminal. To determine which one of the beams is best, the terminal may form the beam quality information by detecting the beam quality. After the terminal reports the beam quality information to the base station according to the configuration information, the base station may select, according to the beam quality information, the beam having the highest signal strength or the maximum received power receivable by terminal, as the final beam for transmitting the information to the terminal. However, before that, the network side device such as the base station may determine whether to receive the beam quality information reported by the terminal. Therefore, the configuration information in this embodiment includes the information reporting identifier indicating whether the beam quality is reported. The information reporting identifier may indicate whether the information content of the beam information is to be finally reported by the terminal, and may also indicate whether the terminal needs to perform measurement on the beam quality. For example, when the information reporting identifier indicates that the beam quality information is to be reported, the terminal needs to measure the detected beam quality information. Otherwise, only the transmission beam transmitted by the base station may be discovered, rather than specifically detecting information such as the received signal strength or received power of each of the beams.

In some cases, the terminal may also measure the beam quality information while discovering the beam transmitted by the base station, but the terminal would determine whether to report the corresponding beam quality information according to the information reporting identifier. As a variation on this case, the terminal may firstly determine beam quality information, but when it is determined that there is no need to report the beam quality information according to the beam quality reporting identifier, the terminal will select and report, according to the beam quality information detected by the terminal, the transmission resource identifier of the one or more beams having the best beam quality or having the beam quality greater than a predetermined threshold, to the base station. In this case, after receiving the beam information reported by the terminal, the network side device may select the current optimal transmission beam to transmit data and/or control commands to the terminal according to the beam information reported by the terminal, or indicate the terminal to use the reception beam which is most suitable for communication with the terminal under the current location of the terminal and current network conditions, thereby achieving high-speed and efficient communication through the beam.

In summary, in this embodiment, both the transmission from the network side device through the configuration information, and the reception by the terminal through the configuration information, would trigger the terminal itself to discovery and detection of the transmission beam transmitted by the base station. After the terminal performs detection and/or measurement, the resource identifier of the detected beam and/or the beam quality information of the detected beam by the terminal will be reported.

The beam-quality-report-switching identifier is used to indicate, when the report type identifier indicates that the resource identifier and the beam quality information are to be reported together, the terminal to start or stop reporting the beam quality information. In this case, it may indicate when the terminal starts reporting the beam quality information and when the terminal stops reporting the beam quality information. With configuration of the beam-quality-report-switching identifier, the report of the beam quality information by the terminal may be stopped in time when the network side device no longer needs the report of the beam quality information, and the terminal may easily be indicated to start reporting the beam quality information when the network side device needs the report of the beam quality information.

In some embodiments, to reduce the number of bits occupied by the configuration information, a same filed may be multiplexed by both the information reporting identifier and the beam-quality-report-switching.

In summary, in this embodiment, based on the configuration information, the terminal may report the resource identifier and the beam quality information of the beam together in a semi-static reporting manner or a network-side-device-based aperiodic triggering manner, report the resource identifier and the beam quality information together at one time in a periodic reporting manner, and report the resource identifier and the beam quality information separately.

In some cases, the network side device may transmit the configuration information according to the current channel condition. When the channel condition is in a good state, the different fields in the configuration information may be used to indicate the report of the different types of preset information, so that the network side device obtains in detail the result with respect to the discovery and/or detection by the terminal of the transmission beam transmitted by network side. When the current channel is in a bad state, it may indicate through the configuration of the configuration information that only one or more critical preset information is reported, thereby reducing the congestion and/or heavy load caused by the report of the beam information.

In some embodiments, the method further includes: acquiring current channel condition information by the network side device; determining whether the channel condition information meets a preset condition, where the determining may include: considering, when a uplink channel receiving strength characterizing the channel condition information is greater than a preset threshold, the preset condition to be met, otherwise considering the preset condition not to be met; indicating by the information reporting identifier, when the preset condition is met, and when the report type identifier in the configuration information indicates that the resource identifier and the beam quality information are reported together or indicates that the resource identifier and the beam quality information are reported separately, to report both the resource identifier and the beam quality information; otherwise, the report type identifier may indicate that the resource identifier and the beam quality information are not reported together; and the report type identifier may indicate that only the resource identifier or the beam quality information is reported.

In this embodiment, after the network side device transmits the configuration information to the terminal, the terminal will report the beam information according to the configuration information, so that the network side device may control the beam information required to be reported by the terminal to the network side device, by using the configurations of the report type identifier, the report offset, the information reporting identifier and the beam-quality-report-switching identifier in the configuration information, thereby reducing a large signaling overhead due to the reports by the terminal for all the obtained beam information. In addition, the network side device may also flexibly control, the amount of information to be reported by the terminal, by setting the configuration information according to information such as the status of the transmission channel, thereby reducing a congestion caused by a large number of reports of the beam information when the transmission channel condition is poor, as well as avoiding an information missing caused by the beam information insufficiently reported by the terminal when the transmission channel condition is good. Therefore, the beam information acquisition method provided in this embodiment has advantages such as a small signaling overhead, flexible control by the network side device on the report of the beam information according to the channel condition information. In some embodiments, the configuration information further includes at least one of: (i) a report time type identifier, (ii) a report period indicator, (iii) a report bandwidth identifier, (iv) a transmission resource group identifier, (v) a transmission resource identifier, (vi) a reception resource group identifier, and (vii) a reception resource identifier.

The report time type identifier is configured to indicate the terminal to report the beam information in a periodic reporting manner, or a semi-static reporting manner, or an aperiodic triggering manner.

The report period indicator is configured to indicate, in the case of reporting the beam information in the periodic reporting manner or the semi-static reporting manner, a time interval between two adjacent reporting of the beam information.

The report bandwidth identifier includes an entire bandwidth identifier, a partial bandwidth identifier, or a sub-band identifier, wherein the entire bandwidth identifier is configured to indicate an entirety of bandwidths used for reporting the beam information in all bandwidths supported by the terminal; the partial bandwidth identifier is configured to indicate a part of the bandwidths used for reporting the beam information in all bandwidths supported by the terminal; and the sub-band identifier is configured to indicate a part of sub-bands used for reporting the beam information in all bandwidths supported by the terminal.

The transmission resource group identifier is configured to be used by the terminal to distinguish a transmission beam set or a transmission beam group transmitted by the network side.

The transmission resource identifier is configured to be used by the terminal to distinguish the transmission beam transmitted by the network side.

The reception resource group identifier is configured to indicate a reception beam set or a reception beam group of the terminal.

The reception resource identifier is configured to indicate the reception beam of the terminal.

The report time type identifier is used to indicate which of the manners is to be used in the time domain by the terminal to report the beam information. For example, the report time type identifier may be used to indicate that the terminal periodically reports the beam information. The semi-static manner may be used to indicate the terminal to periodically report the beam information in a specific time period. The report in the aperiodic triggering manner may be a mode that, the network side device transmits the notification to trigger the terminal to report the beam information. In this embodiment, the difference between the periodic reporting manner and the semi-static reporting manner lies in that, in the periodic reporting manner, once the terminal starts reporting information, the terminal will thereafter perform the report based on the specific time point, whereas in the semi-static reporting manner, the terminal may perform the periodic report only within a time period which is after the start time indicated by the base station and before the end time indicated by the base station. In the receiving side, it needs to be re-arranged or triggered by the network side device such as the base station on whether the terminal is to report the beam information or which of the manners is to be selected to report the beam information.

The report period indicator may be used to indicate the time interval between two consecutive reporting of the beam information in the periodic reporting manner or the semi-static reporting manner. The time interval here may be 5 milliseconds or 10 milliseconds, etc., in which case the terminal reports the beam quality information every 5 milliseconds or 10 milliseconds.

In the embodiment, the report bandwidth identifier may include at least the entire bandwidth identifier and the partial bandwidth identifier. The bandwidth here may be one supported by the terminal. The entire bandwidth identifier is used to indicate that the beam information is reported in the entirety of the bandwidth supported by the terminal. The partial bandwidth identifier is used to indicate that the beam information is reported by terminal by only using a part of the bandwidth supported by the terminal. For example, the bandwidth supportable by the terminal is A megabit, and the bandwidth identifier indicates that B megabit bandwidth supported by the terminal is used to report the beam information, where B is smaller than A; and B and A are both positive numbers.

In some embodiments, the report bandwidth identifier may further include a sub-band identifier. In this embodiment, the sub-band identifier is used to indicate one or more sub-bands used for reporting the beam information in all bandwidths supported by the terminal. In this embodiment, the sub-band identifier indicating the bandwidth usually used to report the beam information may be a predetermined number of Physical Resource Blocks (PRBs), such as 8 PRBs, 6 PRBs, or 4 PRBs. The bandwidth used for reporting the beam information and indicated by the part of the bandwidth identifier may be greater than the predetermined number of PRBs. For example, the part of the bandwidth identifier may indicate more than 8 PRBs to be used for reporting the beam information.

In this embodiment, where the reception resource group indicated by the reception resource group identifier may be a reception beam set or a reception beam group receivable by the terminal. In this embodiment, the reception beam set and the reception beam group each include two or more beams. In this embodiment, the reception resource group identifier may be used to indicate which of the reception beam sets or reception beam groups is used by the terminal to detect the beam transmitted by the network side device.

The reception resource identifier is used to indicate a reception beam of the terminal. Specifically, the reception resource identifier may be used to indicate which one of the reception beams is used by the terminal to detect the beam transmitted by the terminal.

In some embodiments, the beam information reported by the terminal may include a transmission resource identifier, both a transmission resource identifier and a beam quality information, a reception resource identifier, a reception resource identifier group, both a reception resource identifier and a beam quality information, both a reception resource identifier group and a beam quality information. In summary, the beam information reported by the terminal at least includes beam identifier information from at least one of: (i) the transmission resource identifier, (ii) the reception resource identifier, and (iii) the reception resource group identifier. In addition to the beam identifier information discovered by the terminal, the beam information reported by the terminal may also include the beam quality information and the like The configuration information in this embodiment may further include one or more of a report time type identifier, a report period indicator, a report bandwidth identifier, a transmission resource group identifier, a transmission resource identifier, a reception resource group identifier, and a reception resource identifier. After the configuration information including such above information is transmitted by the network side device to the terminal, the network side device may control which transmission beams to be detected by the terminal, which bandwidths or sub-bands to be used for reporting the beam information, or which type of period to be selected for reporting the beam information, thereby increasing the control of the network side device on the report of the beam information by the terminal, and facilitating the acquisition of the corresponding configuration parameters by the network side device based on its own requirements and current network conditions. With the control on the report of the beam information by the terminal, the network side device may be ensured to obtain the desired beam information while reducing the signaling overhead as much as possible, thus realizing the adaptive adjustment for the reported beam information based on the current channel conditions.

In some embodiments, the step S120 may include: receiving separately, when the report type identifier indicates that the resource identifier and the beam quality information are reported separately by the terminal and the information reporting identifier indicates that the resource identifier and the beam quality information are both reported, the resource identifier and the beam quality information corresponding to the transmission beam detected by the terminal. The resource identifier is transmitted in a first period, and the beam quality information is transmitted in a second period. The first period is greater than the second period, or the second period is greater than the first period.

In this embodiment, the resource identifier and the beam quality information are both needed to be reported, but are reported separately. At this point, the report of the resource identifier and the report of the beam quality information may be independent with each other and they are reported individually. For example, the separate reports may be implemented by setting the different starting times but same time period for the reports. In this embodiment, the first period in which the resource identifier or the beam quality information is transmitted is greater than the second period in which the beam quality information or the resource identifier is transmitted, or the second period is greater than the first period, meaning that the first period is not equal to the second period.

In this embodiment, when the beam quality information and the transmission resource identifier are separately reported (that is, they are not reported together), and the information reporting identifier indicates that the resource identifier and the beam quality information are both to be reported, the resource identifier and the beam quality information may be separately reported by the terminal in different reporting periods. In the embodiment, the first period is not equal to the second period. In general, the start times of the reporting periods are different for the beam quality information and the resource identifier. For example, the first period is greater than the second period, or the second period is greater than the first period.

For example, when the terminal reports in the first period the resource identifier corresponding to the transmission beam detected by the terminal, the terminal reports the beam quality information in the second period, and the first period is three times the second period, then after the terminal reports a discovered beam, the beam quality of the beam is detected by the terminal in the second period. The base station will receive a resource identifier, and hence receive in three times the beam quality information of the beam quality corresponding to the transmission resource identifier. The reported resource identifier here may be a transmission resource identifier of the transmission beam itself detected by the terminal, or may be a reception resource identifier of the reception beam used by the terminal to detect the transmission beam.

In some cases, the network side device such as the base station does not need the terminal to frequently report the beam quality information. To reduce the information processing load of the base station, the base station only needs the terminal to occasionally report the beam quality information of the beam detected by the terminal. In this case, the resource identifier may be reported by the terminal in a relatively short period, and the corresponding beam quality information may be reported by the terminal in a relatively long period.

In the embodiments of the present disclosure, when the resource identifier and the beam information are separately reported, the reports thereof may be performed in different periods, so that the base station may adjust, based on its requirements, the period during which the resource identifier and the beam quality information are reported by the terminal, thereby adaptively adjusting the reporting period of the individual information in the beam information and/or the amount of reported information based on the actual requirements of the network side device and the current network conditions.

Figure 2:
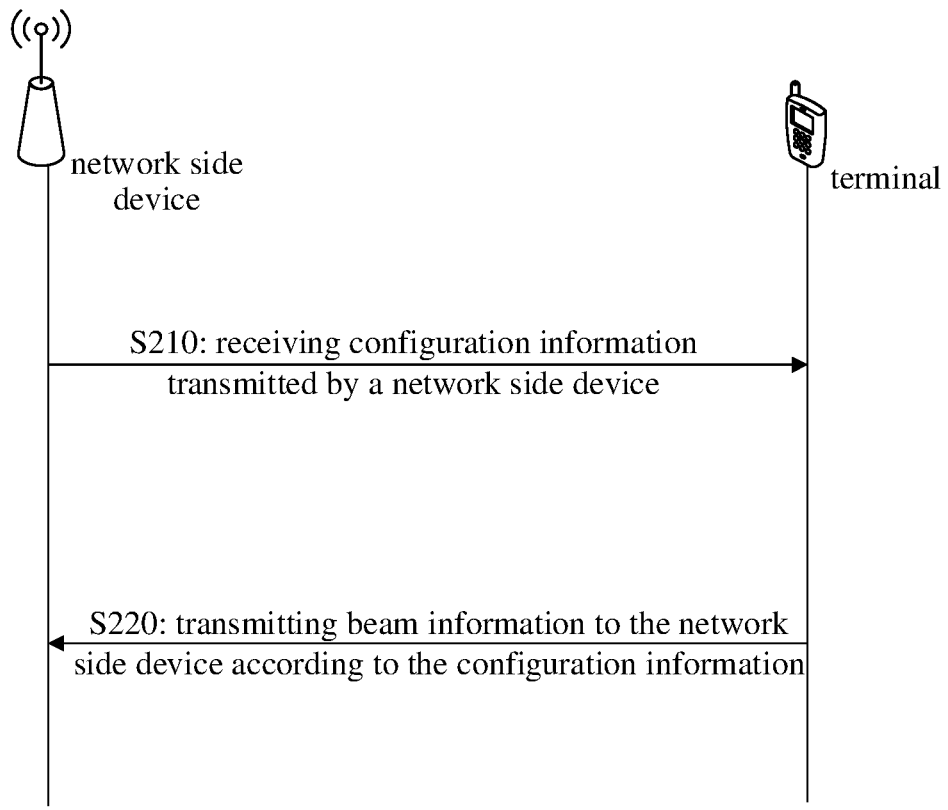
FIG. 2 is a schematic flowchart of a beam information reporting method according to an embodiment of the present disclosure.

As shown in FIG. 2, an embodiment of the present disclosure provides a beam information reporting method, including Step S210 to Step S220.

Step S210: receiving configuration information transmitted by a network side device, wherein the configuration information includes at least one of: (i) a report type identifier, (ii) a report offset, an information reporting identifier, and (iii) a beam-quality-report-switching identifier.

Step S220: transmitting beam information to the network side device according to the configuration information.

The report type identifier is configured to indicate whether at least two types of beam information are reported together. The at least two types of the beam information include: a resource identifier of a beam and beam quality information; the resource identifier includes a transmission resource identifier and/or a reception resource identifier. The transmission resource identifier is configured to be used by the terminal to distinguish a transmission beam transmitted by a network side. The reception resource identifier is configured to be used by the network side device to distinguish a reception beam of the transmission beam detected by the terminal. The beam quality information is formed by the terminal through measuring the transmission beam and configured to indicate beam quality of the transmission beam. The report offset is configured to indicate, when the at least two types of the beam information are reported together, an offset on a reported resource. The information reporting identifier is configured to indicate to, when the resource identifier and the beam quality information are reported separately, report the resource identifier and/or the beam quality information. The beam-quality-report-switching identifier is configured to indicate, when the resource identifier and the beam quality information are reported together, the terminal to start or stop reporting the beam quality information.

The beam information reporting method in this embodiment may be applied to the terminal.

In this embodiment, before the terminal reports the beam information, the terminal first receives configuration information from the network side and performs the discovery and/or detection of the beam according to the configuration information, and then transmits the beam information to the network side device according to the configuration information.

In this embodiment, the beam information includes at least the resource identifier of the beam detected by the terminal, and may also include the beam quality of the beam detected by the terminal in some cases. The resource identifier of the beam detected by the terminal here may be the transmission resource identifier of the beam, a reception resource identifier corresponding to a reception beam on the terminal side, or the like.

With the beam information reporting method provided by the embodiments, before transmitting the beam information, the terminal will receive the configuration information transmitted by the network side device, and then report the beam information according to the configuration information instead of reporting all of the detected beam information or reporting the detected beam information in an arbitrary way, so that the report of unnecessary beam information to the network side device may be reduced, thereby saving the signaling overhead. The configuration information is acquired by the network side device depending on its own requirements and/or the current channel conditions, etc. Therefore, by reporting the beam information based on the configuration information, the information content and the information amount of the reported beam information may be adapted to the requirements of the network side device and the current channel conditions, thereby reducing the possibility of congestion or missing information caused by the information content and the information amount of the reported beam information being not adapted to the requirements of the network side device and the current channel conditions.

For example, Step S210 may include: receiving at least one of a MAC layer CE, a physical layer DCI, and a RRC signaling carrying the configuration information. In an embodiment, the terminal receives the configuration information by receiving one or more of the RRC signaling, the MAC layer CE, or the DCI.

In this embodiment, the second receiving unit of the terminal receives the configuration information by receiving the RRC signaling, the MAC layer CE, or the DCI.

In some embodiments, the configuration information further includes at least one of: (i) a report time type identifier, (ii) a report period indicator, (iii) a report bandwidth identifier, (iv) a transmission resource group identifier, (v) a transmission resource identifier, (vi) a reception resource group identifier, and (vii) a reception resource identifier.

The report time type identifier is configured to indicate the terminal to report the beam information in a periodic reporting manner, or a semi-static reporting manner, or an aperiodic triggering manner.

The report period indicator is configured to indicate, in the case of reporting the beam information in the periodic reporting manner or the semi-static reporting manner, a time interval between two adjacent reporting of the beam information.

The report bandwidth identifier includes an entire bandwidth identifier, a partial bandwidth identifier, or a sub-band identifier, wherein the entire bandwidth identifier is configured to indicate an entirety of bandwidths used for reporting the beam information in all bandwidths supported by the terminal; the partial bandwidth identifier is configured to indicate a part of the bandwidths used for reporting the beam information in all bandwidths supported by the terminal; and the sub-band identifier is configured to indicate a part of sub-bands used for reporting the beam information in all bandwidths supported by the terminal.

The transmission resource group identifier is configured to be used by the terminal to distinguish a transmission beam set or a transmission beam group transmitted by the network side.

The transmission resource identifier is configured to be used by the terminal to distinguish the transmission beam transmitted by the network side.

The reception resource group identifier is configured to indicate a reception beam set or a reception beam group of the terminal.

The reception resource identifier is configured to indicate the reception beam of the terminal.

The descriptions for various types of configuration information, such as the report type identifier and the report offset in this embodiment may refer to the foregoing embodiments, which are not repeated herein.

In this embodiment, the configuration information includes the above-mentioned information or identifier, which may facilitating the terminal to report the beam information according to the requirements of the network side device, thereby achieving the small signaling overhead, and enhancing the control of the network side device.

In some embodiments, the step S220 may include: receiving separately, when the report type identifier indicates that the resource identifier and the beam quality information are to be reported separately and the information reporting identifier indicates that the resource identifier and the beam quality information are both to be reported, the resource identifier and the beam quality information corresponding to the detected transmission beam. The resource identifier is transmitted to the network side device in a first period, and the beam quality information is transmitted to the network side device in a second period. The first period is longer than the second period, or the second period is longer than the first period.

Here, the report type identifier indicates that the beam quality information and the resource identifier are not to be reported together, but the information reporting identifier indicates that both the resource identifier and the beam quality information are to be reported. In this case, the resource identifier and the beam quality information may be separately reported in different periods. The first period may be longer than the second period, or the second period may be longer than the first period. The values for the periods may be determined according to the requirements for the report of the beam information between the terminal and the base station, and is not specifically defined herein.

According to the embodiments of the present disclosure, the resource identifier and the beam quality information may be reported in different periods, and may be flexibly adjusted according to the requirements of the network side device and the current channel conditions, thereby achieving the small signaling overhead and adapting to the channel conditions.

Figure 3:
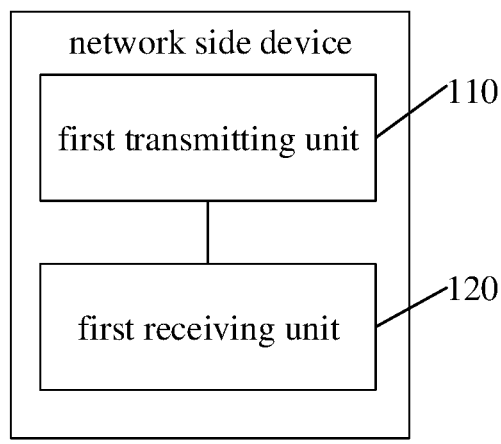
FIG. 3 is a schematic structural diagram of a network side device according to an embodiment of the present disclosure.

As shown in FIG. 3, this embodiment provides a network side device, including: a first transmitting unit 110 and a first receiving unit 120

The first transmitting unit 110 is configured to transmit configuration information to the terminal, wherein the configuration information includes at least one of: (i) a report type identifier, (ii) a report offset, (iii) an information reporting identifier, and (iv) a beam-quality-report-switching identifier.

The first receiving unit 120 is configured to receive beam information, which is reported by the terminal based on the configuration information.

The report type identifier is configured to indicate whether at least two types of beam information are reported together, wherein the at least two types of the beam information comprise: a resource identifier of a beam and beam quality information; the resource identifier includes a transmission resource identifier and/or a reception resource identifier. The transmission resource identifier is configured to be used by the terminal to distinguish a transmission beam transmitted by a network side. The reception resource identifier is configured to be used by the network side device to distinguish a reception beam of the transmission beam detected by the terminal. The beam quality information is formed by the terminal through measuring the transmission beam and configured to indicate information of beam quality of the transmission beam. The report offset is configured to indicate, when the at least two types of the beam information are reported together, an offset on a reported resource. The information reporting identifier is configured to indicate, when the resource identifier and the beam quality information are reported separately, a report of the resource identifier and/or the beam quality information. The beam-quality-report-switching identifier is configured to indicate, when the resource identifier and the beam quality information are reported together, the terminal to start or stop reporting the beam quality information.

The network side device in this embodiment may be a network element of an access network such as a base station, and preferably the network side device may perform information communication directly with the base station.

In this embodiment, the first transmitting unit 110 may correspond to an air interface of the base station or a transmitting antenna corresponding to the air interface, and may be used to transmit the configuration information to the terminal. In this embodiment, the first receiving unit 120 may correspond to a receiving antenna of the base station, and may be used to receive information transmitted by the terminal. The information transmitted by the terminal in this embodiment is the resource identifier and/or the beam quality information resulting from discovery and measurement of the beam by the terminal according to the configuration information, wherein the beam is transmitted by the base station.

The related definitions of the report type identifier and the report offset in this embodiment may refer to the foregoing embodiments, which are not repeated herein.

In this embodiment, after the first transmitting unit 110 of the network side device transmits the configuration information to the terminal, the first receiving unit 120 will receive the beam information which the terminal reports according to the configuration information. In this way, the network side device may control, based on the configuration of the individual identifiers in the configuration information, the beam information which is to be reported by the terminal to the network side device, thereby alleviating the problem of big signaling overhead is big due to the report by the terminal for all the obtained beam information. In addition, the network side device may also flexibly control the amount of information reported by the terminal, by setting the configuration information according to information such as the transmission channel conditions, thereby reducing a congestion caused by a large number of reports of the beam information when the transmission channel condition is poor, and reducing an information missing caused by the beam information insufficiently reported by the terminal when the transmission channel condition is good. Therefore, the beam information acquisition method provided in this embodiment has advantages such as a small signaling overhead, flexible control by the network side device according to the channel condition information on the report of the beam information.

Furthermore, the configuration information further includes at least one of: (i) a report time type identifier, (ii) a report period indicator, (iii) a report bandwidth identifier, (iv) a transmission resource group identifier, (v) a transmission resource identifier, (vi) a reception resource group identifier, and (vii) a reception resource identifier.

The report time type identifier is configured to indicate the terminal to report the beam information in a periodic reporting manner, or a semi-static reporting manner, or an aperiodic triggering manner.

The report period indicator is configured to indicate, in the case of reporting the beam information in the periodic reporting manner or the semi-static reporting manner, a time interval between two adjacent reporting of the beam information.

The report bandwidth identifier includes an entire bandwidth identifier, a partial bandwidth identifier, or a sub-band identifier, wherein the entire bandwidth identifier is configured to indicate an entirety of bandwidths used for reporting the beam information in all bandwidths supported by the terminal; the partial bandwidth identifier is configured to indicate a part of the bandwidths used for reporting the beam information in all bandwidths supported by the terminal; and the sub-band identifier is configured to indicate a part of sub-bands used for reporting the beam information in all bandwidths supported by the terminal.

The transmission resource group identifier is configured to be used by the terminal to distinguish a transmission beam set or a transmission beam group transmitted by the network side.

The transmission resource identifier is configured to be used by the terminal to distinguish the transmission beam transmitted by the network side.

The reception resource group identifier is configured to indicate a reception beam set or a reception beam group of the terminal.

The reception resource identifier is configured to indicate the reception beam of the terminal.

The configuration information in this embodiment may further include one or more of a report time type identifier, a report period indicator, a report bandwidth identifier, a transmission resource group identifier, a transmission resource identifier, a reception resource group identifier, and a reception resource identifier. Such information may be used by the network side device to flexibly control, according to its own requirements and/or current network conditions, the report of the beam information performed by the terminal, thereby reducing the signaling overhead.

In some embodiments, the first receiving unit 120 is configured to receive separately, when the report type identifier indicates that the resource identifier and the beam quality information are reported separately by the terminal and the information reporting identifier indicates that the resource identifier and the beam quality information are both reported, the resource identifier and the beam quality information corresponding to the transmission beam detected by the terminal. The resource identifier is transmitted in a first period, and the beam quality information is transmitted in a second period. The first period is longer than the second period, or the second period is longer than the first period.

When the base station indicates the terminal to separately report the resource identifier and the beam quality information, and these two types of information need to be both reported, the terminal reports the resource identifier and the beam quality information by using different periods. In this case, in this embodiment, the resource identifier and the beam quality information are received by the first receiving unit 120 in different periods.

The resource identifier and the beam information provided in the embodiment of the present disclosure are reported respectively in different periods, so that the base station is facilitated to adjust, based on its own requirements, the periods used for the reports of the resource identifier and the beam quality information performed by the terminal, thereby adaptively adjust the periods used for reporting the individual information in the beam information and/or the amount of reported information based on the actual requirements for network side device and the current network conditions.

In some embodiments, the first transmitting unit 110 is configured to transmit the configuration information by using at least one of RRC signaling, a MAC layer CE and a physical layer DCI that may be a signaling carrying the configuration information in a part thereof. In some embodiments, the first transmitting unit 110 may also be configured to transmit the configuration information to the terminal via the dedicated signaling of the configuration information, rather than being limited to the above-mentioned types of signaling.

In this embodiment, the configuration information is carried by the above-mentioned types of signaling which may also carry another signaling, so that no dedicated signaling is required for the transmission of the configuration information, thereby enhancing the compatibility with the related technology. The network side device in the embodiments of the present disclosure may achieve the same technical effects as the above-mentioned beam information acquisition method, and thus it is not described herein again.

Figure 4:
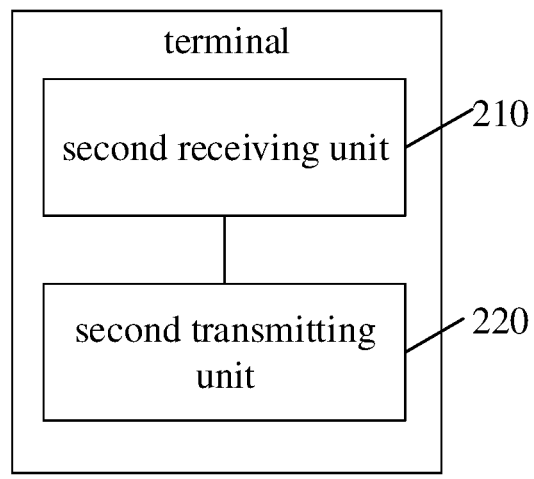
FIG. 4 is a schematic structural diagram of a terminal according to an embodiment of the present disclosure.

As shown in FIG. 4, this embodiment provides a terminal, which includes: a second receiving unit 210 and a second transmitting unit 220.

The second receiving unit 210 is configured to receive configuration information transmitted by the network side device, where the configuration information includes at least one of: (i) a report type identifier, (ii) a report offset, (iii) an information reporting identifier, and (iv) a beam-quality-report-switching identifier.

The second transmitting unit 220 is configured to transmit beam information to the network side device according to the configuration information.

The report type identifier is configured to indicate whether at least two types of beam information are reported together. The at least two types of the beam information include: a resource identifier of a beam and beam quality information. The resource identifier includes a transmission resource identifier and/or a reception resource identifier. The transmission resource identifier is configured to be used by the terminal to distinguish a transmission beam transmitted by a network side. The reception resource identifier is configured to be used by the network side device to distinguish a reception beam of the transmission beam detected by the terminal. The beam quality information is formed by the terminal through measuring the transmission beam and configured to indicate beam quality of the transmission beam. The report offset is configured to indicate, when the at least two types of the beam information are reported together, an offset on a reported resource. The information reporting identifier is configured to indicate to, when the resource identifier and the beam quality information are reported separately, report the resource identifier and/or the beam quality information. The beam-quality-report-switching identifier is configured to indicate, when the resource identifier and the beam quality information are reported together, the terminal to start or stop reporting the beam quality information.

The terminal described in this embodiment may be a mobile phone, a tablet computer, an in-vehicle terminal, or an Internet of Things terminal, etc. In this embodiment, the second receiving unit 210 may correspond to a receiving antenna of the terminal, and the second transmitting unit 220 may correspond to a transmitting antenna of the terminal of the user.

In this embodiment, the second receiving unit 210 receives the configuration information transmitted by the network side device such as the base station, and then reports the beam information to the network side device such as the base station according to the discovery and detection of the beam transmitted by the base station in conjunction with the configuration information. The network side device such as a base station selects a suitable beam to communicate with the terminal according to the beam information reported by the terminal, or manages the transmission beam and the reception beam between the base station and the terminal.

The terminal provided by the embodiment receives the configuration information from the network side device before reporting the beam information, and then reports the beam information according to the configuration information, so that the information may be reported according to the requirements of the network side and/or the current network conditions, thereby reducing the report of the unnecessary information, reducing the signaling overhead and adapting to the current network conditions.

Optionally, the configuration information further includes at least one of: (i) a report time type identifier, (ii) a report period indicator, (iii) a report bandwidth identifier, (iv) a transmission resource group identifier, (v) a transmission resource identifier, (vi) a reception resource group identifier, and (vii) a reception resource identifier.

The report time type identifier is configured to indicate the terminal to report the beam information in a periodic reporting manner, or a semi-static reporting manner, or an aperiodic triggering manner.

The report period indicator is configured to indicate, in the case of reporting the beam information in the periodic reporting manner or the semi-static reporting manner, a time interval between two adjacent reporting of the beam information.

The report bandwidth identifier includes an entire bandwidth identifier, a partial bandwidth identifier, or a sub-band identifier, wherein the entire bandwidth identifier is configured to indicate an entirety of bandwidths used for reporting the beam information in all bandwidths supported by the terminal; the partial bandwidth identifier is configured to indicate a part of the bandwidths used for reporting the beam information in all bandwidths supported by the terminal; and the sub-band identifier is configured to indicate sub-bands used for reporting the beam information in all bandwidths supported by the terminal.

The transmission resource group identifier is configured to be used by the terminal to distinguish a transmission beam set or a transmission beam group transmitted by the network side.

The transmission resource identifier is configured to be used by the terminal to distinguish the transmission beam transmitted by the network side.

The reception resource group identifier is configured to indicate a reception beam set or a reception beam group of the terminal.

The reception resource identifier is configured to indicate the reception beam of the terminal.

In this embodiment, the configuration information includes the above-mentioned information or identifier, facilitating the terminal to report the beam information according to the requirements of the network side device, thereby achieving the small signaling overhead, and enhancing the control by the network side device. Optionally, the second transmitting unit 220 is configured to transmit separately, when the report type identifier indicates that the resource identifier and the beam quality information are reported separately and the information reporting identifier indicates that the resource identifier and the beam quality information are both reported, the resource identifier and the beam quality information corresponding to the detected transmission beam. The resource identifier is transmitted to the network side device in a first period, and the beam quality information is transmitted to the network side device in a second period. The first period is longer than the second period, or the second period is longer than the first period.

In this embodiment, the terminal determines, according to the report type identifier, that the resource identifier and the beam quality information are need to be reported separately, and determines, according to the beam quality identifier, that the beam quality information needs to be reported. In this case, the terminal reports the transmission resource identifier and/or the reception resource identifier in the first period, and reports the beam quality information in the second period. The first period here is not equal to the second period. Specifically, the first period is longer than the second period, or the second period is longer than the first period.

The resource identifier and the beam quality information according to the embodiments of the present disclosure may be reported in different periods, and may be flexibly adjusted according to the requirements of the network side device and the current channel conditions, thereby achieving the small signaling overhead and being adapted to the channel conditions.

Optionally, the second receiving unit 210 is specifically configured to receive at least one of an RRC signaling, a MAC layer CE, or a physical layer DCI that carries the configuration information.

In this embodiment, the beam quality reporting device receives the configuration information by receiving the RRC signaling, the MAC layer CE, or the DCI, and parsing the signaling to obtain the configuration information carried by the signaling, thus achieving the acquisition for the configuration information.

In this embodiment, the configuration information is carried by using the above-mentioned signaling, and the second receiving unit 210 receives the configuration information by receiving the RRC signaling, the MAC layer CE, and the DCI, so that no dedicated signaling is required for the configuration information, and thus it has strong compatibility with related technologies. The terminal according to this embodiment of the present disclosure may achieve the same technical effects as the above-mentioned beam information reporting method, and is not described herein again.

The beam quality information acquisition method provided in some examples may be a method applied to beam information of a downlink beam in downlink beam management.

Figure 5:
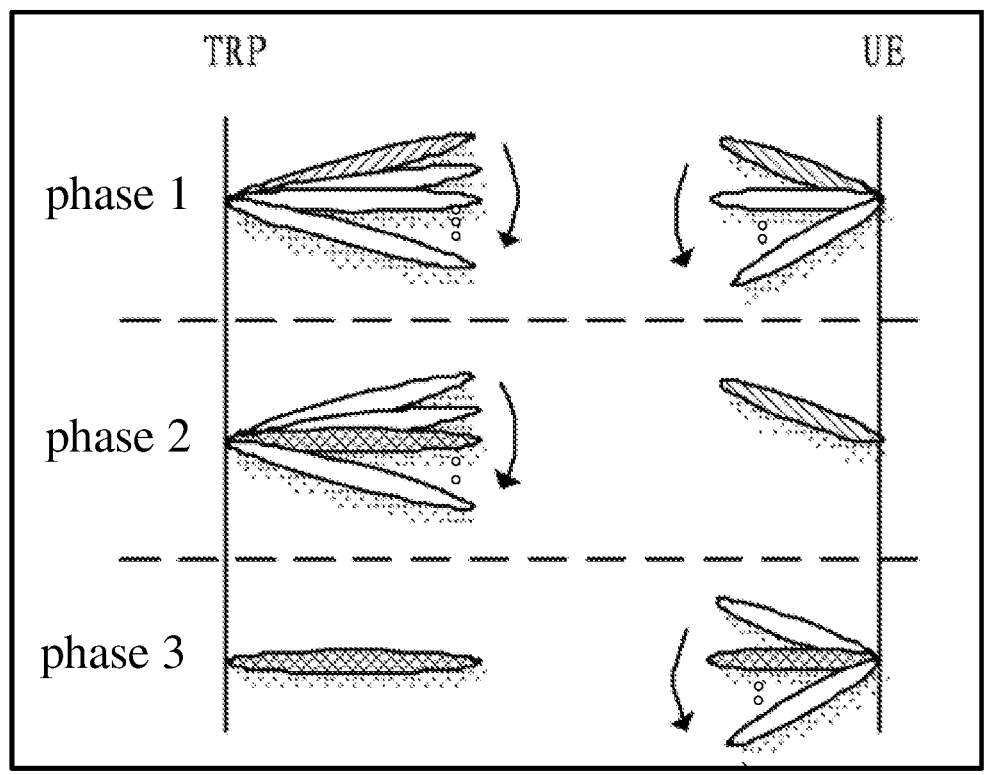
FIG. 5 is a schematic flowchart of a downlink beam management method according to an embodiment of the present disclosure.

FIG. 5 is a schematic diagram of a downlink beam management provided in some embodiments, which includes Phase 1 to Phase 3.

Phase 1: The UE measures different Transmission and Reception Point (TRP) beams for determining the transmission beam of the TRP and the reception beam of the UE.

Phase 2: The reception beam of the UE is unchanged, but the transmission beam between the TRPs and/or in the TRP is changed for using in measuring different TRP transmission beams by the UE.

Phase 3: The transmission beam of the TRP is unchanged, but the reception beam of the UE is changed for using in measuring different UE reception beams by the UE. The TRP in this example may refer to a beam transmission node such as a base station that transmits a beam to a terminal.

As shown in FIG. 1 and FIG. 2, the TRP in this example transmits configuration information including at least a report type identifier and a report offset to the terminal before receiving the beam quality information of the beam measured by the UE, so that it is facilitated for the UE to report the measured beam information according to the configuration information in one or more stages.

In some embodiments, the configuration information may be directly carried in the downlink beam that needs to be detected by the terminal. When the downlink beam is detected by the terminal, the configuration information is obtained by the terminal, and the beam information is reported according to the configuration information.

In this example, the beam information acquisition method on the TRP side, or the beam information reporting method on the terminal side, is applied to the downlink beam management process. In some embodiments, the terminal may move between cells. When the terminal moves within a cell, the beam through which the terminal communicates with the base station needs to be re-determined, and in this case the method shown in FIG. 1 and FIG. 2 may also be used to acquire and/or report the beam quality information.

Figure 6:
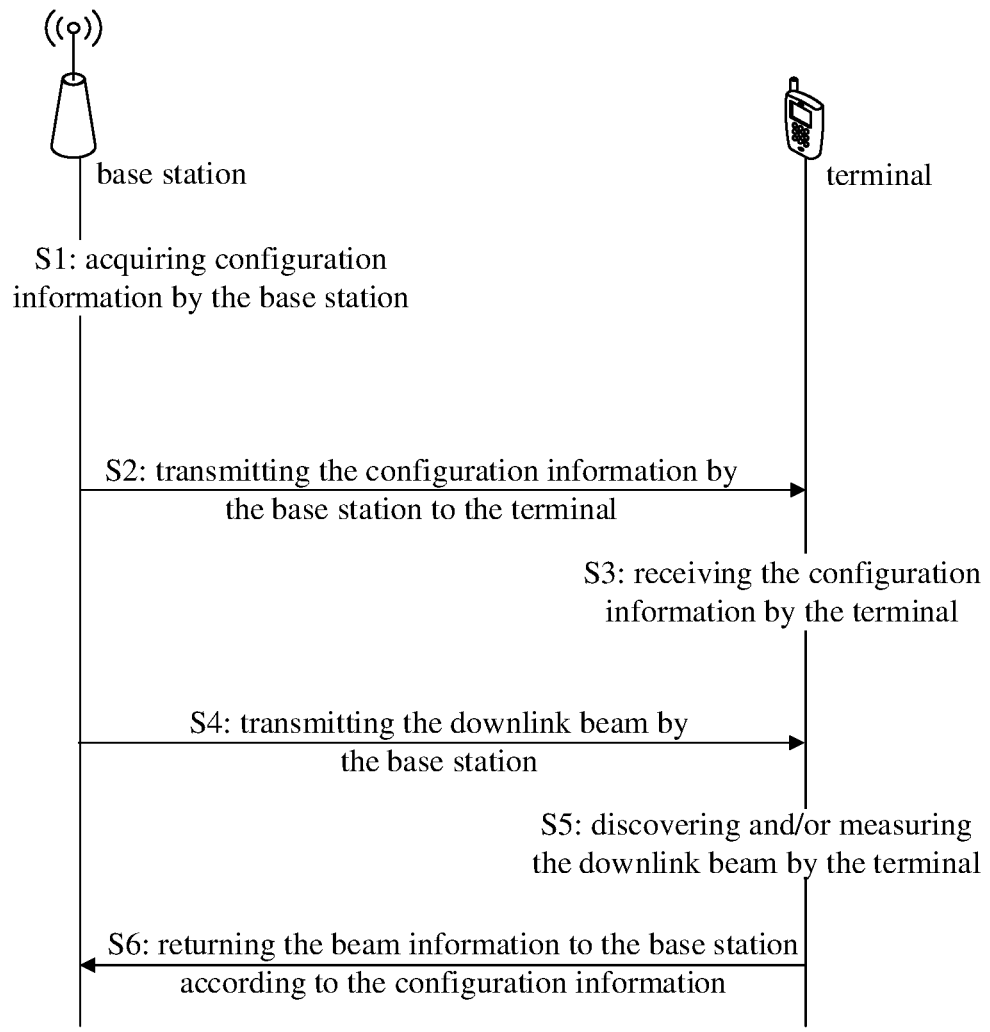
FIG. 6 is a schematic flowchart of a beam information processing method according to an embodiment of the present disclosure.

As shown in FIG. 6, in some examples, a beam quality information processing method is provided. The method includes Step S1 to Step S6.

Step S1: acquiring configuration information by the base station, wherein the configuration information is any configuration information provided by the above embodiments. For example, the configuration information may include one or more of a report type identifier, a report offset, an information reporting identifier and a beam-quality-report-switching identifier. The configuration information may also include one or more of a report time type identifier, a report period indicator, a report bandwidth identifier, a transmission resource group identifier, a transmission resource identifier, a reception resource group identifier and a reception resource identifier.

Step S2: transmitting the configuration information by the base station to the terminal, wherein the configuration information is transmitted through, for example, a RRC signaling or a DCI or a MAC layer CE.

Step S3: receiving the configuration information by the terminal. Specifically, the terminal acquires the configuration information, by receiving the RRC signaling, the DCI, and/or the MAC layer CE and extracting the information in the specific field.

Step S4: transmitting the downlink beam by the base station. For example, according to the transmission resource identifier currently notified to the terminal, the transmission beam corresponding to the notified transmission resource identifier is transmitted.

Step S5: discovering and/or measuring the downlink beam by the terminal. The measuring the downlink beam here includes: measuring beam quality information such as a received strength or a received power of the downlink beam; in some embodiments, the terminal may further perform measurement of the downlink beam according to the configuration information. Specifically, the downlink beam is detected according to the configuration information, but the beam quality information such as the received power of the downlink beam is not measured; or the downlink beam needs to be detected, and beam quality information such as the received quality is calculated. It may be determined according to the specific requirements of the terminal that how the terminal specifically discovers and/or measures the downlink beam. In this example, the discovery of the downlink beam by the terminal may refer to that the terminal only needs to determine whether it detects a downlink beam, instead of specifically measuring the beam quality of the downlink beam.

Step S6: returning the beam information to the base station according to the configuration information, where the beam information includes at least a resource identifier of a beam or beam quality information detected by the terminal.

Figure 7:
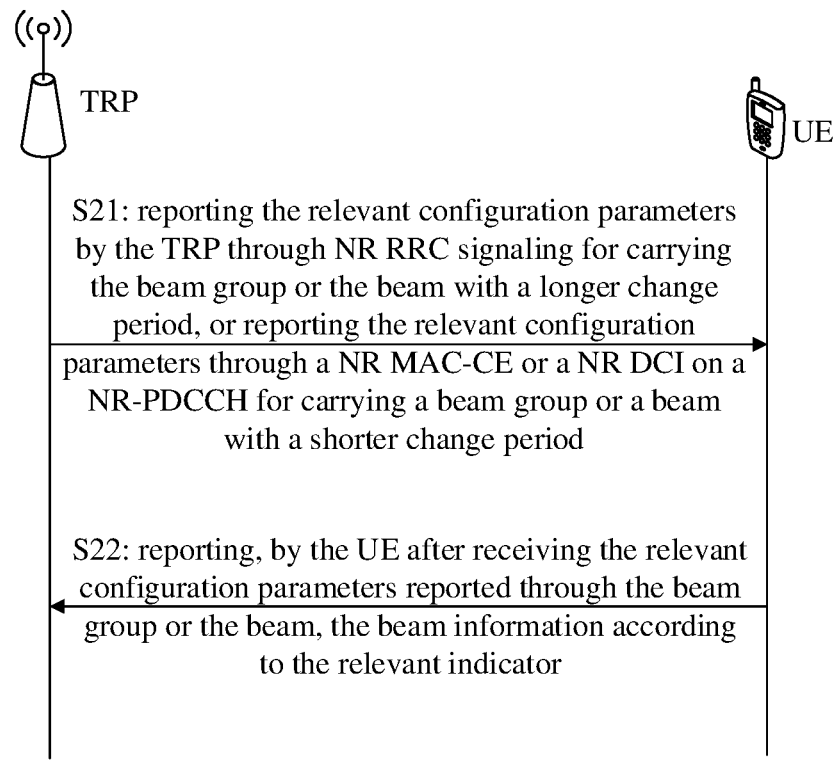
FIG. 7 is a schematic flowchart of a beam information reporting method according to another embodiment of the present disclosure.

As shown in FIG. 7, the present disclosure provides in some embodiments another beam information reporting method. The method includes Step S21 to Step S22.

Step S21: reporting the relevant configuration parameters, such as the beam report type, the report period and the report bandwidth, by the TRP through NR RC signaling for carrying the beam group or the beam with a long change period.

The TRP may also report the relevant configuration parameters, such as the transmission resource identifier, through a NR MAC layer CE or a NR DCI on a New Radio Physical Downlink Control Channel (NR-PDCCH) for carrying a beam group or a beam with a short change period, to enable the UE side to measure and report the beam.

Therefore, in this example, the configuration information transmitted by the TRP to the terminal may be transmitted separately, instead of being necessarily transmitted in one time.

In this example, the corresponding signaling for carrying may be selected according to the rate of change of the configuration information. For example, when the rate of change of the configuration information is greater than the first threshold, the configuration information is transmitted by using the NR RRC signaling, and when the rate of change is not greater than the first threshold, the configuration information is transmitted by the NR DCI or the NR MAC layer CE. Based on this transmission mode for the configuration information, the configuration information may be transmitted in time, and the idle field of different types of signaling may be fully utilized, to improve the effective utilization of time-frequency resources.

Step S22: reporting, by the UE after receiving the relevant configuration parameters reported through the beam group or the beam, the beam information according to the relevant indicator, such as the resource identifier transmitted by the TRP, and the RSRP corresponding to the resource identifier transmitted by TRP which is received by the UE.

In some examples, when the report type identifier in the relevant configuration parameter reported through the beam group or the beam carried by the NR RRC signaling is configured to be "0" initially, it indicates that the CRI and the RSRP are supported to be simultaneously reported.

When the transmission resource identifier indicated by the NR DCI is configured to be "0", it indicates that the beam information of the CRI0 is to be reported. There is no configuration on the beam quality information reporting identifier and the report offset.

Figure 8:
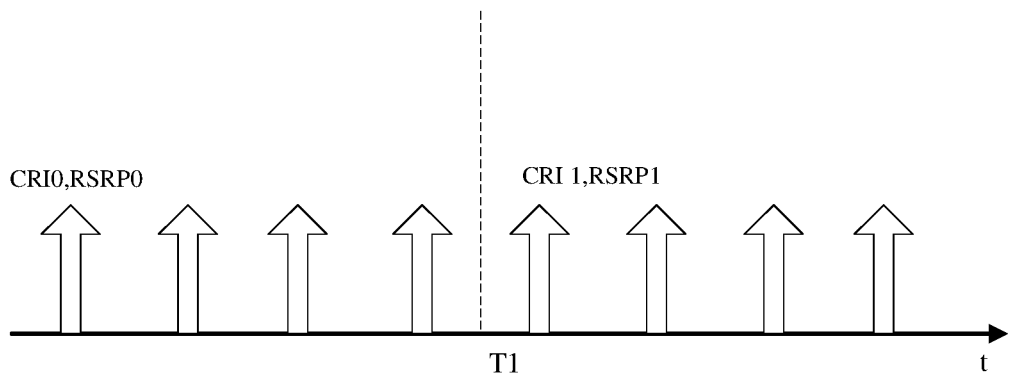
FIG. 8 is a schematic diagram of the report of a resource identifier and beam quality information according to an embodiment of the present disclosure.

As shown in FIG. 8, prior to the time point T1, the terminal simultaneously reports the CRI0 and the RSRP0 of the beam corresponding to the CRI0. The beam is switched at time point "T1", and the transmission resource identifier indicated by the NR DCI is configured to be "1", indicating that only the beam information of a CRI1 is reported. At this time, the beam information reported by the terminal is the CRI1 and the RSRP1 of the beam corresponding to the CRI1.

In this example, the report of the beam information is commonly indicated by both the NR RRC signaling and the NR DCI, thereby reducing the NR DCI overhead and achieving a fast report of the beam information.

In some examples, when the report type identifier in the relevant configuration parameter reported through the beam group or the beam carried by the NR RRC signaling is configured to be "0" initially, it indicates that the CRI and the RSRP are supported to be simultaneously reported. The report offset is configured to be "0", indicating that the offset is 0.5 ms when the CRI and the RSRP are reported at the same time.

For example, at time point T2, the NR DCI indicates that the beam quality information reporting identifier is configured to be "0", indicating that the RSRP is to be reported; the transmission resource identifier indicated by the NR DCI is configured to be "0", indicating that the beam information of the CRI0 is to be reported.

Figure 9:
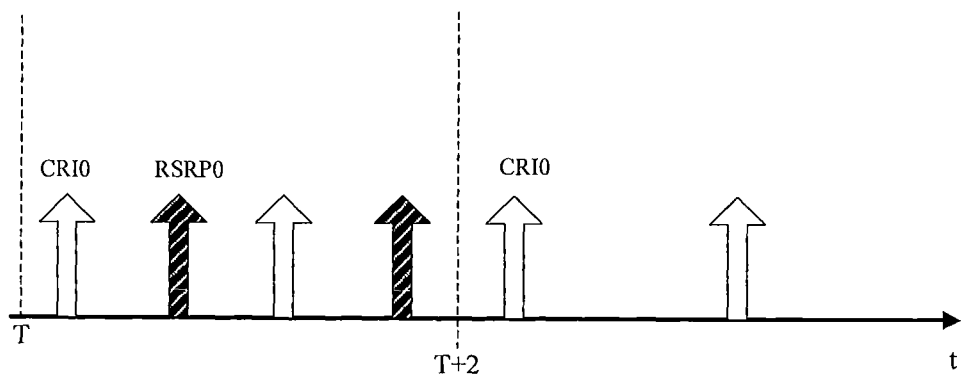
FIG. 9 is a schematic diagram of the report of a resource identifier and beam quality information according to another embodiment of the present disclosure.

As shown in FIG. 9, in the process of one report by the terminal after the time point T2 and before the time point T2+2, the terminal reports the CRI0 and the RSRP0 of the beam corresponding to the CRI0 at different time points.

When that change in the RSRPs continuously reported by the UE is small, at the time point of T+2, the beam quality information reporting identifier indicated by the NR DCI is "1", indicating that the RSRP is not reported. As shown in FIG. 9, the terminal only reports the CRI (for example, the CRI0) after the time point T+2.

This example provides flexible configuration information for reporting the beam, which may effectively reduce the beam information reporting overhead and improve the uplink transmission rate.

The time axis is indicated by "t" in FIGS. 8 and 9.

Figure 10:
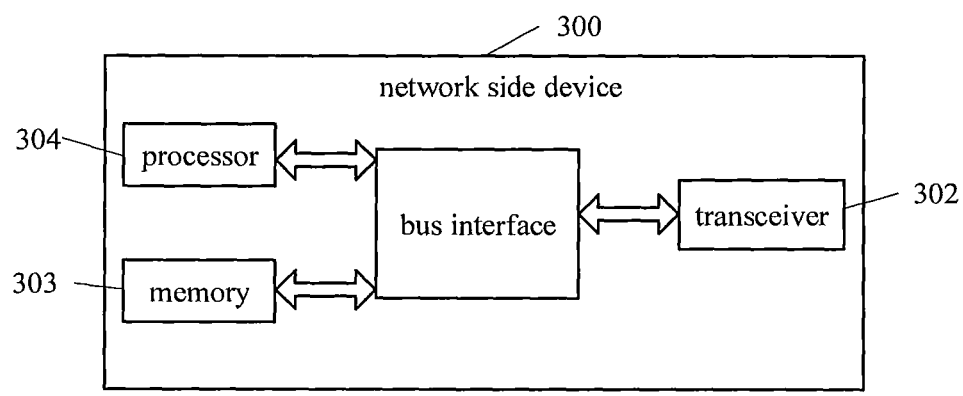
FIG. 10 is a schematic structural diagram of a network side device according to another embodiment of the present disclosure.

In some examples, reference is made to FIG. 10 which is a schematic structural diagram of another network side device according to an embodiment of the present disclosure. As shown in FIG. 10, the network side device 300 includes: a processor 304, a transceiver 302, and a memory 303 and bus interface.

The processor 304 is configured to read a program in the memory 303 and perform the following process: transmitting configuration information to the terminal, where the configuration information includes at least one of: (i) a report type identifier, (ii) a report offset, (iii) an information reporting identifier, and (iv) a beam-quality-report-switching identifier; and receiving beam information which is reported by the terminal based on the configuration information.

The report type identifier is configured to indicate whether at least two types of beam information are reported together. The at least two types of the beam information include: a resource identifier of a beam and beam quality information. The resource identifier includes a transmission resource identifier and/or a reception resource identifier. The transmission resource identifier is configured to be used by the terminal to distinguish a transmission beam transmitted by a network side. The reception resource identifier is configured to be used by the network side device to distinguish a reception beam of the transmission beam detected by the terminal. The beam quality information is formed by the terminal through measuring the transmission beam and configured to indicate beam quality of the transmission beam. The report offset is configured to indicate, when the at least two types of the beam information are reported together, an offset on a reported resource. The information reporting identifier is configured to indicate to, when the resource identifier and the beam quality information are reported separately, report the resource identifier and/or the beam quality information. The beam-quality-report-switching identifier is configured to indicate, when the resource identifier and the beam quality information are to be reported together, the terminal to start or stop reporting the beam quality information.

Optionally, the configuration information further includes at least one of: (i) a report time type identifier, (ii) a report period indicator, (iii) a report bandwidth identifier, (iv) a transmission resource group identifier, (v) a transmission resource identifier, (vi) a reception resource group identifier, and (vii) a reception resource identifier. The report time type identifier is configured to indicate the terminal to report the beam information in a periodic reporting manner, or a semi-static reporting manner, or an aperiodic triggering manner. The report period indicator is configured to indicate, in the case of reporting the beam information in the periodic reporting manner or the semi-static reporting manner, a time interval between two adjacent reporting of the beam information. The report bandwidth identifier includes an entire bandwidth identifier, a partial bandwidth identifier, or a sub-band identifier, wherein the entire bandwidth identifier is configured to indicate an entirety of bandwidths used for reporting the beam information in all bandwidths supported by the terminal; the partial bandwidth identifier is configured to indicate a part of the bandwidths used for reporting the beam information in all bandwidths supported by the terminal; and the sub-band identifier is configured to indicate a part of sub-bands used for reporting the beam information in all bandwidths supported by the terminal. The transmission resource group identifier is configured to be used by the terminal to distinguish a transmission beam set from a transmission beam group transmitted by the network side. The transmission resource identifier is configured to be used by the terminal to distinguish the transmission beam transmitted by the network side. The reception resource group identifier is configured to indicate a reception beam set or a reception beam group of the terminal. The reception resource identifier is configured to indicate the reception beam of the terminal.

Optionally, the processor 304 is further configured to: receive separately, when the report type identifier indicates that the resource identifier and the beam quality information are reported separately by the terminal, the resource identifier and the beam quality information corresponding to the transmission beam detected by the terminal. The resource identifier is transmitted by the terminal in a first period, and the beam quality information is transmitted by the terminal in a second period. The first period is longer than the second period, or the second period is longer than the first period Optionally, the network side device transmits the configuration information through at least one of: (i) a RRC signaling, (ii) a MAC layer CE, and (iii) a physical layer DCI.

In FIG. 10, the bus architecture may include any number of interconnected buses and bridges, which specifically are connected by one or more processors represented by processor 304 and various circuits of memory represented by memory 303. The bus architecture may also link together various other circuits such as peripheral devices, voltage regulators, and power management circuits. The bus interface is provided. Transceiver 302 may include a plurality of components, including a transmitter and a receiver, which provide means for communicating with various other devices on a transmission medium.

The processor 304 takes charge for managing the bus architecture and general processing, and the memory 303 may store data used by the processor 304 during operation. The network side device 300 in the embodiments of the present disclosure may achieve the same technical effects as the above-mentioned beam information acquisition method, and hence is not described herein again.

Figure 11:
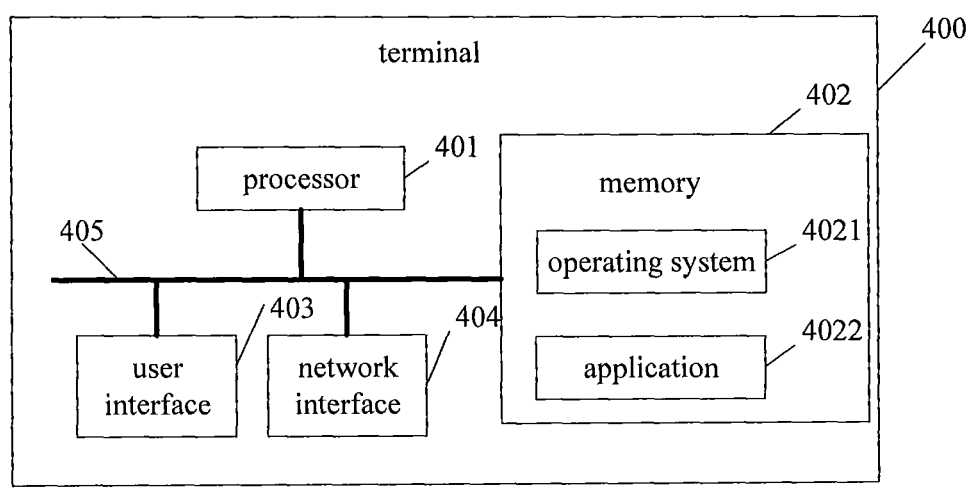
FIG. 11 is a schematic structural diagram of a terminal according to another embodiment of the present disclosure.

FIG. 11 is a schematic structural diagram of a terminal according to another embodiment of the present disclosure. The terminal 400 shown in FIG. 11 includes at least one processor 401, a memory 402, at least one network interface 404, and a user interface 403. The various components in terminal 400 are coupled together by a bus system 405. It should be appreciated that bus system 405 is used to implement connection communication between these components. Bus system 405 includes, in addition to the data bus, a power bus, a control bus, and a status signal bus. However, for clarity of description, various buses are all labeled as the bus system 405 in FIG. 11.

The user interface 403 may include a display, a keyboard, a button, or a pointing device (e.g., a mouse, a trackball, a touchpad, or a touch screen, etc.).

It should be appreciated that the memory 402 in this embodiment of the present disclosure may be a volatile memory or a non-volatile memory, or may include both the volatile memory and the non-volatile memory. The non-volatile memory may be a Read-Only Memory (ROM), a Programmable Read Only Memory (PROM), an Erasable Programmable Read Only Memory (EPROM), an Electrically Erasable Programmable Read Only Memory (EEPROM) or flash memory. The volatile memory may be a Random Access Memory (RAM) that acts as an external cache. By way of example and not limitation, many forms of RAMs may be used, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synchlink Dynamic Random Access Memory (SLDRAM) and a Direct Rambus Random Access Memory (DRRAM). The memory 402 of the systems and methods described herein is intended to include, without being limited to, these and any other suitable types of memories.

In some embodiments, the memory 402 stores elements including an operating system 4021 and an application 4022, executable modules or data structures, or a subset thereof, or extended set thereof.

The operating system 4021 includes various system programs, such as a framework layer, a core library layer and a driver layer, for implementing various basic services and processing hardware-based tasks. The application 4022 includes various applications, such as a Media Player and a Browser, for implementing various application services. A program implementing the method of the embodiments of the present disclosure may be included in the application 4022.

In the embodiment of the present disclosure, the processor 401 is configured to execute, by executing a program or an indication stored in the memory 402 which may specifically be a program or an indication stored in the application 4022, the following steps: receiving configuration information transmitted by the network side device, wherein the configuration information includes at least one of: (i) a report type identifier, (ii) a report offset, (iii) an information reporting identifier, and (iv) a beam-quality-report-switching identifier; transmitting beam information to the network side device according to the configuration information.

The report type identifier is configured to indicate whether at least two types of beam information are reported together. The at least two types of the beam information include: a resource identifier of a beam and beam quality information; the resource identifier includes a transmission resource identifier and/or a reception resource identifier. The transmission resource identifier is configured to be used by the terminal to distinguish a transmission beam transmitted by a network side. The reception resource identifier is configured to be used by the network side device to distinguish a reception beam of the transmission beam detected by the terminal. The beam quality information is formed by the terminal through measuring the transmission beam and configured to indicate beam quality of the transmission beam. The report offset is configured to indicate, when the at least two types of the beam information are reported together, an offset on a reported resource. The information reporting identifier is configured to indicate to, when the resource identifier and the beam quality information are reported separately, report the resource identifier and/or the beam quality information. The beam-quality-report-switching identifier is configured to indicate, when the resource identifier and the beam quality information are reported together, the terminal to start or stop reporting the beam quality information.

Optionally, the configuration information further includes at least one of: (i) a report time type identifier, (ii) a report period indicator, (iii) a report bandwidth identifier, (iv) a transmission resource group identifier, (v) a transmission resource identifier, (vi) a reception resource group identifier, and (vii) a reception resource identifier. The report time type identifier is configured to indicate the terminal to report the beam information in a periodic reporting manner, or a semi-static reporting manner, or an aperiodic triggering manner. The report period indicator is configured to indicate, in the case of reporting the beam information in the periodic reporting manner or the semi-static reporting manner, a time interval between two adjacent reporting of the beam information. The report bandwidth identifier includes an entire bandwidth identifier, a partial bandwidth identifier, or a sub-band identifier, wherein the entire bandwidth identifier is configured to indicate an entirety of bandwidths used for reporting the beam information in all bandwidths supported by the terminal; the partial bandwidth identifier is configured to indicate a part of the bandwidths used for reporting the beam information in all bandwidths supported by the terminal; and the sub-band identifier is configured to indicate sub-bands used for reporting the beam information in all bandwidths supported by the terminal. The transmission resource group identifier is configured to be used by the terminal to distinguish a transmission beam set or a transmission beam group transmitted by the network side. The transmission resource identifier is configured to be used by the terminal to distinguish the transmission beam transmitted by the network side. The reception resource group identifier is configured to indicate a reception beam set or a reception beam group of the terminal. The reception resource identifier is configured to indicate the reception beam of the terminal.

Optionally, the processor 401 is further configured to transmit separately, when the report type identifier indicates that the resource identifier and the beam quality information are reported separately by the terminal and the information reporting identifier indicates that the resource identifier and the beam quality information are both reported, the resource identifier and the beam quality information corresponding to the transmission beam being detected. The resource identifier is transmitted to the network side device in a first period, and the beam quality information is transmitted to the network side device in a second period. The first period is longer than the second period, or the second period is longer than the first period.

Optionally, the processor 401 is further configured to receive at least one of a RRC signaling, a MAC layer CE, and a physical layer DCI that carries the configuration information, which is transmitted by the network side device.

The terminal 400 in the embodiment of the present disclosure may achieve the same technical effects as the above-mentioned embodiments of the beam information reporting method, and hence is not described herein again.

In the embodiments provided by the present application, it should be understood that the disclosed device and method may be implemented in other manners. The device embodiments described above are merely illustrative. For example, the division of the units is merely a logical function division. In actual implementations, there may be another division manner. For example, multiple units or components may be combined, or may be integrated into another system, or some features may be ignored or not executed. In addition, the coupling, or direct coupling, or communication connection between the components shown or discussed may be an indirect coupling or a communication connection through some interfaces, devices or units, and may be electrical, mechanical or has other forms.

The units described above as separate components may or may not be physically separated, and the components displayed as the units may or may not be physical units, that is, they may be located in one place or distributed to multiple network units. Some or all of the units may be selected according to actual requirements to achieve the technical solution of the present disclosure.

In addition, different functional units in the different embodiments of the present disclosure may be integrated into one processing module, or may be separately used as single units, or two or more units may be integrated into one unit. The above integrated unit may be implemented in the form of hardware or in the form of hardware and software functional units.

A person skilled in the art may understand that all or part of the steps of implementing the above method embodiments may be completed by using hardware related to the program indications. The program may be stored in a computer readable storage medium, which is configured for executing the steps of the foregoing method embodiments upon being executed; and the storage medium includes: a removable storage device, a ROM, a RAM, a magnetic disk, or an optical disk, and the like, which may store program codes.

The above content is only the specific embodiments of the present disclosure, but the scope of the present disclosure is not limited thereto. Any changes or substitutions easily conceived by those skilled in the art in the technical scope of the disclosure should fall within the protection scope of the disclosure. Therefore, the protection scope of the present disclosure should be determined by the scope of the appended claims.

What is claimed is:

1. A beam information acquisition method applied to a network side device, wherein the beam information acquisition method comprises:
   transmitting configuration information to a terminal, wherein the configuration information comprises at least one of: (i) a report type identifier, (ii) a report offset, and (iii) an information reporting identifier; and
   receiving beam information reported by the terminal based on the configuration information,
   wherein the report type identifier is configured to indicate whether at least two types of beam information are reported together, wherein the at least two types of the beam information comprise a resource identifier of a beam and beam quality information; the resource identifier comprises a transmission resource identifier, the transmission resource identifier is configured to be used by the terminal to distinguish a transmission beam at a network side; and the beam quality information is formed by the terminal through measuring the transmission beam and configured to indicate beam quality of the transmission beam;
   the report offset is configured to indicate, when the at least two types of the beam information are reported together, an offset on a reported resource; and
   the information reporting identifier is configured to indicate to, when the resource identifier and the beam quality information are reported separately, report the resource identifier and/or the beam quality information.

2. The method according to claim 1, wherein the configuration information further comprises a beam-quality-report-switching identifier, and the beam-quality-report-switching identifier is configured to indicate, when the resource identifier and the beam quality information are reported together, the terminal to start or stop reporting the beam quality information.

3. The method according to claim 1, wherein the configuration information further comprises at least one of:
   a report time type identifier, configured to indicate the terminal to report the beam information in a periodic reporting manner, or a semi-static reporting manner, or an aperiodic triggering manner;
   a report period indicator, configured to indicate, in the case of reporting the beam information in the periodic reporting manner or the semi-static reporting manner, a time interval between two adjacent reporting of the beam information;
   a report bandwidth identifier, comprising an entire bandwidth identifier, a partial bandwidth identifier, or a sub-band identifier, wherein the entire bandwidth identifier is configured to indicate an entirety of bandwidths used for reporting the beam information in all bandwidths supported by the terminal; the partial bandwidth identifier is configured to indicate a part of the bandwidths used for reporting the beam information in all bandwidths supported by the terminal; and the sub-band identifier is configured to indicate a part of sub-bands used for reporting the beam information in all bandwidths supported by the terminal;
   a transmission resource group identifier, configured to be used by the terminal to distinguish a transmission beam set from a transmission beam group at the network side;
   a reception resource group identifier, configured to indicate a reception beam set or a reception beam group of the terminal; and
   a reception resource identifier, configured to be used by the network side device to distinguish a reception beam of the transmission beam detected by the terminal.

4. The method according to claim 1, wherein receiving the beam information reported by the terminal based on the configuration information comprises:
   receiving separately, when the report type identifier indicates that the resource identifier and the beam quality information are reported by the terminal separately, the resource identifier and the beam quality information of the transmission beam detected by the terminal,
   wherein the resource identifier is transmitted by the terminal in a first period, and the beam quality information is transmitted by the terminal in a second period, wherein the first period is longer than the second period, or the second period is longer than the first period.

5. The method according to claim 1, wherein transmitting the configuration information to the terminal comprises:
   transmitting, by the network side device, the configuration information through at least one of: (i) a Radio Resource Control (RRC) signaling, (ii) a Media Access Control (MAC) layer Control Unit (CE), and (iii) a physical layer Downlink Control Indicator (DCI).

6. A beam information reporting method applied to a terminal, wherein the beam information reporting method comprises:
   receiving configuration information transmitted by a network side device, wherein the configuration information comprises at least one of: (i) a report type identifier, (ii) a report offset, and (iii) an information reporting identifier; and
   transmitting beam information to the network side device according to the configuration information,
   wherein the report type identifier is configured to indicate whether at least two types of beam information are reported together, wherein the at least two types of the beam information comprise a resource identifier of a beam and beam quality information; the resource identifier comprises a transmission resource identifier, the transmission resource identifier is configured to be used by the terminal to distinguish a transmission beam at a network side; and the beam quality information is formed by the terminal through measuring the transmission beam and configured to indicate beam quality of the transmission beam;
   the report offset is configured to indicate, when the at least two types of the beam information are reported together, an offset on a reported resource; and
   the information reporting identifier is configured to indicate to, when the resource identifier and the beam quality information are reported separately, report the resource identifier and/or the beam quality information.

7. The method according to claim 6, wherein the configuration information further comprises a beam-quality-report-switching identifier, and the beam-quality-report-switching identifier is configured to indicate, when the resource identifier and the beam quality information are reported together, the terminal to start or stop reporting the beam quality information.

8. The method according to claim 6, wherein the configuration information further comprises at least one of:
   a report time type identifier, configured to indicate the terminal to report the beam information in a periodic reporting manner, or a semi-static reporting manner, or an aperiodic triggering manner;

a report period indicator, configured to indicate, in the case of reporting the beam information in the periodic reporting manner or the semi-static reporting manner, a time interval between two adjacent reporting of the beam information;

a report bandwidth identifier, comprising an entire bandwidth identifier, a partial bandwidth identifier, or a sub-band identifier, wherein the entire bandwidth identifier is configured to indicate an entirety of bandwidths used for reporting the beam information in all bandwidths supported by the terminal; the partial bandwidth identifier is configured to indicate a part of the bandwidths used for reporting the beam information in all bandwidths supported by the terminal; and the sub-band identifier is configured to indicate sub-bands used for reporting the beam information in all bandwidths supported by the terminal;

a transmission resource group identifier, configured to be used by the terminal to distinguish a transmission beam set from a transmission beam group at the network side;

a reception resource group identifier, configured to indicate a reception beam set or a reception beam group of the terminal; and a reception resource identifier, configured to be used by the network side device to distinguish a reception beam of the transmission beam detected by the terminal.

9. The method according to claim 6, wherein transmitting the beam information to the network side device according to the configuration information comprises:

transmitting separately, when the report type identifier indicates that the resource identifier and the beam quality information are reported by the terminal separately, and the information reporting identifier indicates that both of the resource identifier and the beam quality information are to be reported, the resource identifier and the beam quality information corresponding to the detected transmission beam, wherein the resource identifier is transmitted to the network side device in a first period, and the beam quality information is transmitted to the network side device in a second period, wherein the first period is longer than the second period, or the second period is longer than the first period.

10. The method according to claim 6, wherein receiving the configuration information transmitted by the network side device comprises:

receiving at least one of a MAC layer CE, a physical layer DCI, and a RRC signaling carrying the configuration information.

11. A network side device, comprising: a memory, a processor, and a computer program stored in the memory and configured to be executed by the processor, wherein the processor is configured to execute the computer program to:

transmit configuration information to a terminal, wherein the configuration information comprises at least one of: (i) a report type identifier, (ii) a report offset, and (iii) an information reporting identifier; and receive beam information reported by the terminal based on the configuration information;

wherein the report type identifier is configured to indicate whether at least two types of beam information are reported together, wherein the at least two types of the beam information comprise a resource identifier of a beam and beam quality information; the resource identifier comprises a transmission resource identifier, the transmission resource identifier is configured to be used by the terminal to distinguish a transmission beam at a network side; and the beam quality information is formed by the terminal through measuring the transmission beam and configured to indicate beam quality of the transmission beam;

the report offset is configured to indicate, when the at least two types of the beam information are reported together, an offset on a reported resource; and the information reporting identifier is configured to indicate to, when the resource identifier and the beam quality information are reported separately, report the resource identifier and/or the beam quality information.

12. The network side device according to claim 11, wherein the configuration information further comprises a beam-quality-report-switching identifier, and the beam-quality-report-switching identifier is configured to indicate, when the resource identifier and the beam quality information are reported together, the terminal to start or stop reporting the beam quality information.

13. The network side device according to claim 11, wherein the configuration information further comprises at least one of:

a report time type identifier, configured to indicate the terminal to report the beam information in a periodic reporting manner, or a semi-static reporting manner, or an aperiodic triggering manner;

a report period indicator, configured to indicate, in the case of reporting the beam information in the periodic reporting manner or the semi-static reporting manner, a time interval between two adjacent reporting of the beam information;

a report bandwidth identifier, comprising an entire bandwidth identifier, a partial bandwidth identifier, or a sub-band identifier, wherein the entire bandwidth identifier is configured to indicate an entirety of bandwidths used for reporting the beam information in all bandwidths supported by the terminal; the partial bandwidth identifier is configured to indicate a part of the bandwidths used for reporting the beam information in all bandwidths supported by the terminal; and the sub-band identifier is configured to indicate a part of sub-bands used for reporting the beam information in all bandwidths supported by the terminal;

a transmission resource group identifier, configured to be used by the terminal to distinguish a transmission beam set from a transmission beam group at the network side;

a reception resource group identifier, configured to indicate a reception beam set or a reception beam group of the terminal; and a reception resource identifier, configured to be used by the network side device to distinguish a reception beam of the transmission beam detected by the terminal.

14. The network side device according to claim 11, wherein the processor is further configured to execute the computer program to: receive separately, when the report type identifier indicates that the resource identifier and the beam quality information are reported by the terminal separately, and the information reporting identifier indicates that both of the resource identifier and the beam quality information are to be reported, the resource identifier and the beam quality information corresponding to the transmission beam detected by the terminal, wherein the resource identifier is reported in a first period, and the beam quality information is reported in a second period, wherein the first period is longer than the second period, or the second period is longer than the first period.

15. The network side device according to claim 11, wherein the processor is further configured to execute the computer program to: transmit, by the network side device, the configuration information through at least one of: (i) a RRC signaling, (ii) a MAC layer CE, and (iii) a physical layer DCI.

16. A terminal comprising: a memory, a processor, and a computer program stored in the memory and configured to be executed by the processor, wherein the processor is configured to execute the computer program, to implement steps of the beam information reporting method according to claim 6.

17. The terminal according to claim 16, wherein the configuration information further comprises a beam-quality-report-switching identifier, and the beam-quality-report-switching identifier is configured to indicate, when the resource identifier and the beam quality information are reported together, the terminal to start or stop reporting the beam quality information.

18. The terminal according to claim 16, wherein the configuration information further comprises at least one of:
 a report time type identifier, configured to indicate the terminal to report the beam information in a periodic reporting manner, or a semi-static reporting manner, or an aperiodic triggering manner;
 a report period indicator, configured to indicate, in the case of reporting the beam information in the periodic reporting manner or the semi-static reporting manner, a time interval between two adjacent reporting of the beam information;
 a report bandwidth identifier, comprising an entire bandwidth identifier, a partial bandwidth identifier, or a sub-band identifier, wherein the entire bandwidth identifier is configured to indicate an entirety of bandwidths used for reporting the beam information in all bandwidths supported by the terminal; the bandwidth identifier is configured to indicate the bandwidths used for reporting the beam information in all bandwidths supported by the terminal; and the sub-band identifier is configured to indicate sub-bands used for reporting the beam information in all bandwidths supported by the terminal;
 a transmission resource group identifier, configured to be used by the terminal to distinguish a transmission beam set from a transmission beam group at the network side;
 a reception resource group identifier, configured to indicate a reception beam set or a reception beam group of the terminal; and
 a reception resource identifier, configured to be used by the network side device to distinguish a reception beam of the transmission beam detected by the terminal.

19. The terminal according to claim 16, wherein the processor is further configured to execute the computer program to: transmit separately, when the report type identifier indicates that the resource identifier and the beam quality information are reported by the terminal separately, and the information reporting identifier indicates that both of the resource identifier and the beam quality information are to be reported, the resource identifier and the beam quality information corresponding to the detected transmission beam,
 wherein the resource identifier is transmitted to the network side device in a first period, and the beam quality information is transmitted to the network side device in a second period, wherein the first period is longer than the second period, or the second period is longer than the first period.

20. The terminal according to claim 16, wherein the processor is further configured to execute the computer program to: receive at least one of a MAC layer CE, a physical layer DCI, and a RRC signaling carrying the configuration information.

\* \* \* \* \*